(No Model.)
B. SCARLES.
WIRE COP WINDING MACHINE.
No. 364,861. Patented June 14, 1887.
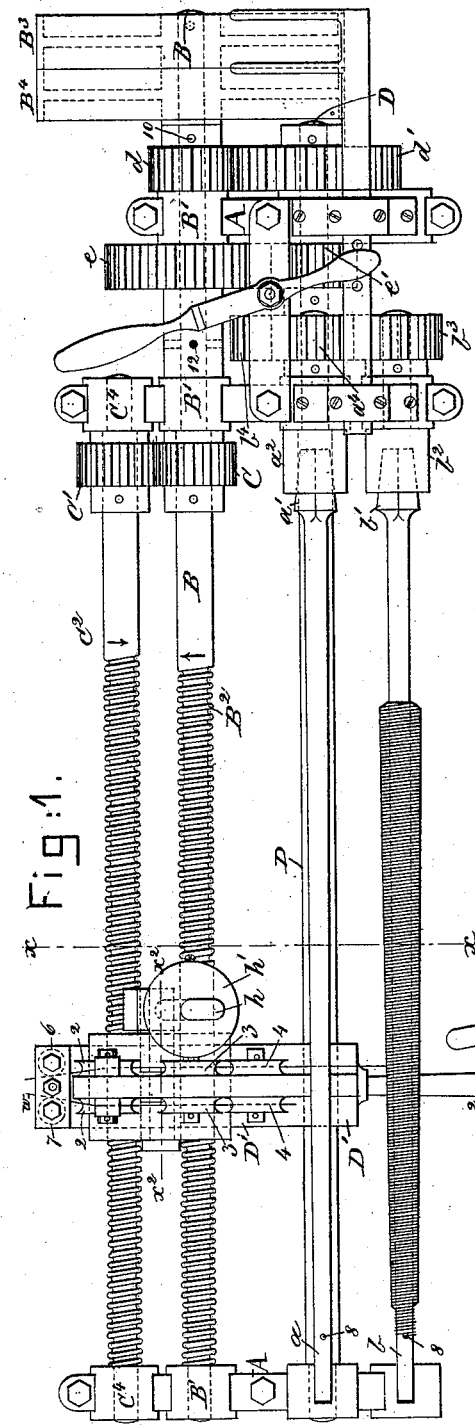
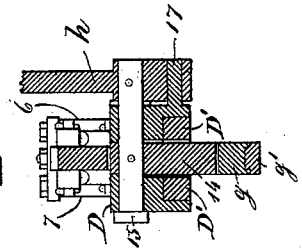
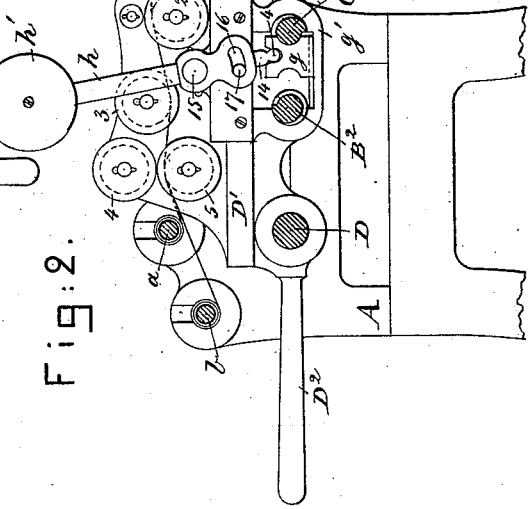
Witnesses.
Fred L. Emery
John F. C. Prentlet
Inventor.
Benjamin Scarles
by Crosby & Gregory attys

UNITED STATES PATENT OFFICE.

BENJAMIN SCARLES, OF CLINTON, MASSACHUSETTS, ASSIGNOR TO THE CLINTON WIRE CLOTH COMPANY, OF SAME PLACE.

WIRE-COP-WINDING MACHINE.

SPECIFICATION forming part of Letters Patent No. 364,861, dated June 14, 1887.

Application filed December 3, 1886. Serial No. 220,586. (No model.)

*To all whom it may concern:*

Be it known that I, BENJAMIN SCARLES, of Clinton, county of Worcester, and State of Massachusetts, have invented an Improvement in Cop-Winding Machines, of which the following description, in connection with the accompanying drawings, is a specification, like letters on the drawings representing like parts.

This invention has for its object the production of an improved machine for winding wire into cop form, to be used in the manufacture of wire-netting or wire-cloth.

My improved machine is adapted to wind two cops simultaneously, straightening the wire as it is being delivered from a carriage which is made to travel from end to end of the machine by screw-shafts, the said shafts being engaged by a nut under the control of a lever within easy reach of the operator.

Figure 1 in top or plan view shows a cop-winding machine embodying my invention; Fig. 2, a section thereof in the line $x\,x$ of Fig. 1, looking toward the left; Fig. 3, a like sectional view looking toward the right; and Fig. 4 is a sectional detail, to be described, the section being on the line $x^2$, Fig. 1.

The frame-work A has suitable bearings for the different moving devices. The main screw-shaft B, as herein shown, is prolonged, as represented in Fig. 1, and is provided with a fast pulley, $B^3$, and a loose pulley, $B^4$, for the reception of any usual driving-belt. This shaft has three bearings, as B', the screw-threaded portion of the shaft being designated by the letter $B^2$.

The shaft B has fast to it a spur-gear, C, which engages a spur-gear, C', of like diameter, fast to the screw-shaft $C^2$, having bearings at $C^4$, the two shafts B and $C^2$, whenever the fast pulley is in motion, being rotated in unison in the direction of the arrows thereon.

The frame-work has bearings for a shaft, D, which serves as a guide for a carriage, D', provided with a series of tension and straightening rollers or sheaves, 2 3 4 5, and upright rolls or posts 6 and 7, the wire $w$ to be wound into cop form passing between the rolls or posts 6 and 7 and then over and under the said tension and straightening rolls, as shown in Fig. 2, the leading end of each wire as each cop is started being attached to one or the other spindle, $a$ or $b$, the attachment being herein shown as effected by inserting the wires into a hole, as 8, in the spindle, on which the wire is to be wound. The spindles, for greatest convenience of insertion and removal, and for connection with the means for driving them, are provided at one end with heads, as $a'\,b'$, to enter sockets, as $a^2\,b^2$, the socket $a^2$ being on a shaft having fixed to it a spur-gear, $a^4$. The head $b^2$ is on a short shaft having an attached spur-gear, $b^3$. The two spur-gears $a^4\,b^3$ are driven by a toothed gear, $b^4$, fast on a shaft, D.

To enable the same machine to be used to wind both coarse and fine wire for cops, it is necessary to provide means for varying the speed of the spindles with relation to the speed of the screw-shafts which cause the carriage D' to travel and deliver the wire to the spindles. When coarser wire is to be wound, the speed of the spindles is slow, and when the wire is fine the speed is to be faster.

The shaft B has loose upon it two gears, $d\,e$, and the shaft D has fixed to it two gears, $d'\,e'$, the gear $d'$ being of just the same diameter as the gear $b^4$. The hub of the gear $d$ has a hole, 10, and the hub of the gear $e$ a like hole, into one or the other of which may be inserted, as desired by the operator, a suitable pin, 12, which, also entering a hole in the shaft B, will cause one or the other of said gears to be fixed on the shaft, the fixed gear, whichever it may be, then becoming the driver for the spindles $a\,b$. If the gear $d$ is fixed, it, in engagement with the gear $d'$, will rotate the shaft D, and the gear $e'$ will turn the gear $e$ on the shaft B, the speed of the spindles being the slowest; but if the gear $d$ is loose and the gear $e$ is fast, as shown, to the shaft B, then the gear $e$ becomes the driver, it engaging the gear $e'$, fast on the shaft D, and driving the spindles at their fastest speed.

A nut, $g$, arranged between the two parallel screw-shafts B $C^2$, and in a saddle, $g'$, attached to the carriage D', is provided at its side next the said screws with threads constituting half-nuts to engage one or the other of the said screw-shafts at will, the carriage being moved to the left in Fig. 1 when the said nut engages the screw-threads $B^2$ and to the right when the said nut engages the threads of the screw-shaft $C^2$. This nut is herein shown as notched at its upper side to receive the lower end, 4, of an arm, 14, fast on the stud 15, to which is attached a weighted lever, $h$, the lower end of the said lever being slotted, as at 16, to receive a stop, 17, by which to limit the throw of the lever and the movement of the nut $g$.

To remove the cop of wire from the machine, it is only necessary to cut the wire where it enters the hole 8, which leaves the cop free to be drawn off the end of the tapering spindle, its small end being temporarily lifted from the bearing in which it turns.

I claim—

1. In a machine for winding wire, the combination, with the spindle-rotating shaft or shafts and two screw-shafts, and means to rotate all of said shafts, of a traveling carriage, tension and straightening rolls or sheaves mounted on said carriage, a threaded nut also mounted on said carriage between said screw-shafts and adapted to be thrown in engagement with either of them, and a weighted lever by which the said nut may be shifted in position and held in engagement with either of said screw-shafts, whereby the said carriage may be moved positively in opposite directions alternately, substantially as set forth.

2. The combination, with the carriage D', the rolls or sheaves mounted thereon, the spindle-operating shafts and their gearing, and the two screw-shafts and means to rotate them, of the sliding nut $g$, mounted on the said carriage between said screw-shafts, the slotted arm 14, the stop 17, and the weighted lever $h\ h'$, substantially as set forth.

3. In a machine for winding wire, the main screw-shaft B, the shaft D and its attached gears $d'\ e'\ b^4$, the sockets $a^2\ b^2$, gears $a^4\ b^3$, gears C C', screw-shaft $C^2$, carriage D', and nut $g$, combined with the two gears $d\ e$, normally loose on the shaft B, and with means to fix one or the other of the said gears on the said shaft B according to the speed at which it is desired to rotate the sockets $a^2\ b^2$, substantially as set forth.

In testimony whereof I have signed my name to this specification in the presence of two subscribing witnesses.

BENJAMIN SCARLES.

Witnesses:
BURT CHELLIS,
JOHN W. FORRESTER.